United States Patent
Lentz et al.

(10) Patent No.: US 6,506,034 B1
(45) Date of Patent: Jan. 14, 2003

(54) LIQUID PUMP WITH A CLAW POLE STATOR

(75) Inventors: Gerd Lentz, Buehl (DE); Christoph Heier, Iffezheim (DE); Matthias Henschel, Rheinmuenster (DE); Wolfgang Krauth, Achern-Sasbachried (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/787,573

(22) PCT Filed: Jul. 12, 2000

(86) PCT No.: PCT/DE00/02266

§ 371 (c)(1),
(2), (4) Date: Mar. 19, 2001

(87) PCT Pub. No.: WO01/07789

PCT Pub. Date: Feb. 1, 2001

(30) Foreign Application Priority Data

Jul. 22, 1999 (DE) .......................................... 199 34 382

(51) Int. Cl.⁷ .............................................. F04B 17/03
(52) U.S. Cl. ................................ 417/423.8; 417/423.7; 417/423.14; 417/370; 417/369
(58) Field of Search .................. 417/432.7, 423.14, 417/370, 369, 423.8

(56) References Cited

U.S. PATENT DOCUMENTS

| | | | |
|---|---|---|---|
| 3,853,429 A | 12/1974 | Wiedenmann | |
| 4,274,024 A | 6/1981 | Gottschalk | |
| 4,363,984 A | 12/1982 | Okuda | |
| 4,695,419 A | 9/1987 | Inariba | |
| 5,234,192 A | * 8/1993 | Kalippke et al. | 251/129.11 |
| 5,831,359 A | * 11/1998 | Jeske | 310/12 |
| 5,955,804 A | * 9/1999 | Kusase et al. | 310/59 |
| 5,997,261 A | * 12/1999 | Kershaw et al. | 310/54 |
| 6,135,729 A | * 10/2000 | Aber | 417/356 |

FOREIGN PATENT DOCUMENTS

| | | | |
|---|---|---|---|
| DE | 37 02 028 A1 | 8/1988 | |
| GB | 2042279 A | * 9/1982 | H02K/7/14 |

OTHER PUBLICATIONS

Patent Abstracts of Japan, vol. 1995, No. 11, Dec. 26, 1995 & JP 07 208380 A, Aug. 8, 1995.

Patent Abstracts of Japan, vol. 1999, No. 11, Sep. 30, 1999 & JP 11 166500, Jun. 22, 1999.

* cited by examiner

*Primary Examiner*—Charles G. Freay
*Assistant Examiner*—Emmanuel Sayoc
(74) *Attorney, Agent, or Firm*—Michael J. Striker

(57) ABSTRACT

A fluid pump, in particular for the coolant and heating system of a motor vehicle, has a stator (21) of claw pole construction and a rotor (6), separated from the stator (21) by a pipe (11), which is immersed in the coolant and forms a vane wheel. The rotor (6) is disposed radially inside the stator (21).

9 Claims, 2 Drawing Sheets

LIQUID PUMP WITH A CLAW POLE STATOR

PRIOR ART

The invention relates to an electrically operated fluid pump, in particular a coolant pump for the coolant system/heating system of a motor vehicle, with a stator and with a rotor, separated from the stator by a pipe, that is immersed in the coolant and carries a vane wheel.

The principle of separating the stator and rotor by a pipe, which makes it possible to dispose the rotor immersed in the coolant, is known from German Patent DE 3 702 028 C2.

A more-detailed description of such a pump can be found in German Patent Disclosure DE 44 11 960 A1. The pump shown in this reference has a bell-shaped rotor, whose cylindrical interior is engaged by the stator. A tubular or cup-shaped wall extends between the rotor and the stator, and a shaft about which the rotor is suspended rotatably is let into the bottom of the cup.

The anchoring of the shaft extends to only a slight depth into the interior of the cylindrical hollow chamber, because the space in this chamber is needed virtually entirely for accommodating the stator. The cylindrical wall between the stator and the rotor is quite thin, so that the gap width will be only slight and thus magnetic circuit losses will be slight. This impairs the stability of the suspension of the rotor.

A printed circuit board with a commutation circuit for the power supply to the stator can be disposed only in the axial extension of the stator and thus increases the installation depth of the pump.

ADVANTAGES OF THE INVENTION

The present invention on the one hand creates a coolant pump of reduced installation depth. On the other, it creates a coolant pump which while using little material enables stable support of the rotor and thus effectively limits disruptions in synchronism that might be caused by unavoidable imbalances, and which furthermore minimizes losses of efficiency resulting from friction between the rotor and the coolant in which it is immersed.

The short structural length is attained by using a claw pole stator as the stator for the pump of the invention.

The stable support and the reduction of friction losses are attained by disposing the rotor radially inside the stator. While in the known coolant pump, friction with the coolant can occur both on the inside of the rotor between the rotor and the pipe surrounding the stator and on the outside between the rotor and the surrounding housing, when the rotor is shifted into the interior of the stator, there is only an interstice, namely the space between the rotor and the pipe that separates the rotor from the stator. By this provision alone, friction losses are already reduced. A further factor that contributes to minimizing friction losses is that with the same radial dimensions of the motor, the diameter of the pipe can be kept less, when the rotor is on the inside. Thus for the same rpm, the path velocity of the rotor on its outer circumference is reduced, and as a consequence the friction is also less than in the conventional construction with the rotor on the outside.

The rotor located on the inside also has a reduced moment of inertia and can therefore be accelerated faster, and with less of a load on the electronic switches of its power supply circuit, than is possible with a rotor located on the outside. The reduced moment of inertia naturally leads to a reduced imbalance as well.

Shifting the stator to the outer circumference of the rotor also makes it possible for the shaft on which the rotor revolves to be lengthened, so that the center of gravity of the rotor comes to be located inside the shaft. The tilting moments that are exerted by an imbalance of the rotor on the mounts of the shaft are reduced thereby, so that overall, a lesser material thickness of the mounts suffices to anchor the rotor securely.

To keep the moment of inertia of the rotor slight and nevertheless achieve stable support, it is proposed that along with its permanent magnetic outer cylinder, the rotor should have a bearing shaft surround the shaft, which bearing shaft is spaced apart from the rotor by an empty annular chamber. This annular chamber can be open on its side remote from the vane wheel of the rotor.

The rotor is preferably made in one piece of a plastic-bonded magnetic material.

Further characteristics and advantages of the invention will become apparent from the ensuing description of exemplary embodiments with reference to the drawings.

DRAWINGS

DESCRIPTION OF THE EXEMPLARY EMBODIMENTS

Figure 1:
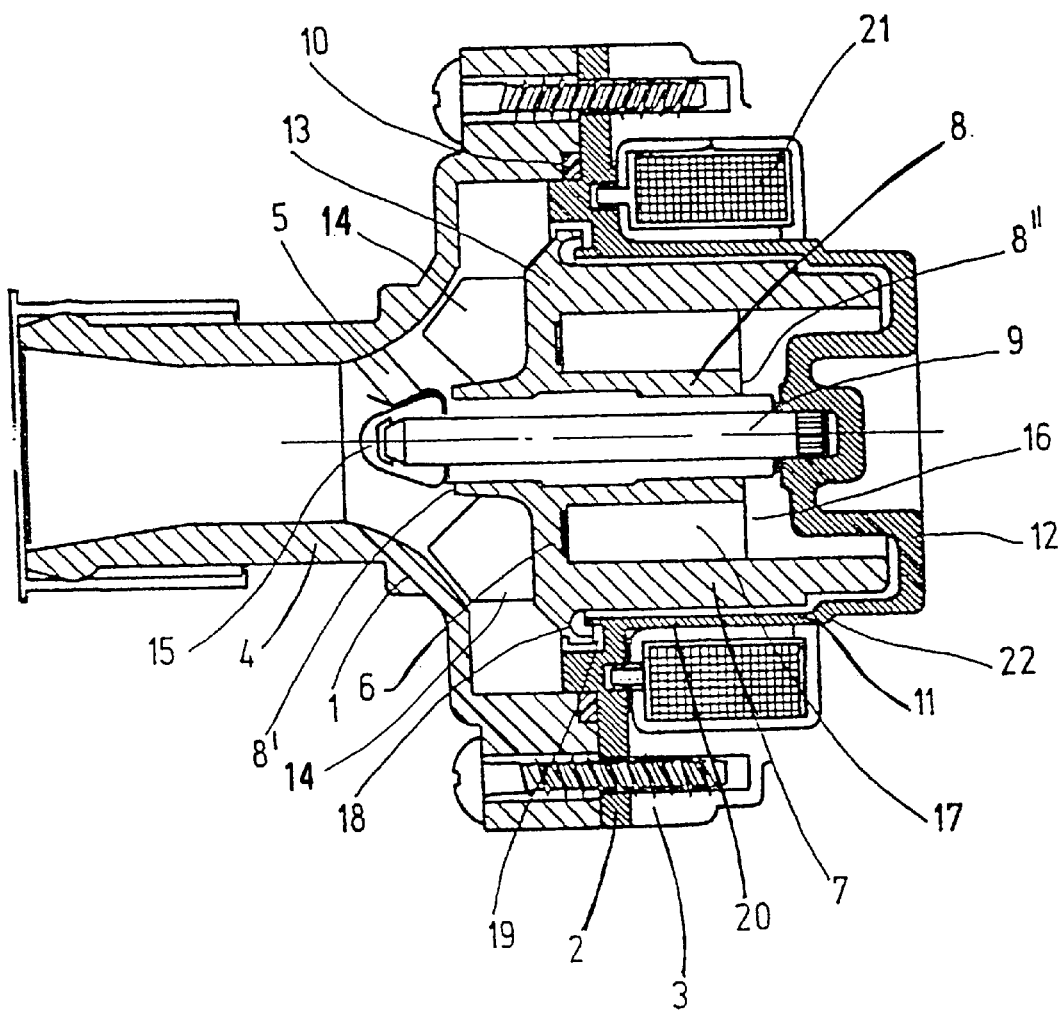
FIG. 1 shows an axial section through a coolant pump of the invention.

FIG. 1 shows a coolant pump of the invention in an axial section. The pump has a three-piece housing, which comprises a front housing part with a suction neck 4 embodied on it, and a compression neck, not shown, a partition 2, and a rear housing part 3, this last part not being shown completely in the drawing. Parts 1, 2, 3 are held together by screws, which keep the partition 2 fastened between the front part 1 and rear part 3. A sealing ring 10 is clamped between the front housing part 1 and the partition 2. The partition 2 comprises a nonmagnetic material and has a thin-walled portion in the form of a pipe 11, which together with a bottom 12 forms a cup in which a rotor 6 is accommodated.

The rotor 6 is made in one piece, for example by injection molding, of a plastic-bonded magnetic material, for instance powdered magnetic material embodied in a synthetic resin matrix or plastic matrix, and it includes an outer cylinder 7 that with only slight spacing follows the course of the pipe 11. The outer cylinder 7, on its end toward the aspiration neck 4, is closed by a flange 13, which carries a plurality of vanes 14.

A bearing shaft 8 integrally connected to the flange 13 extends through the interior of the cylinder 7. At least on its axial ends 8', 8", it is rotatably connected to a stationary shaft 9 and surrounds the shaft substantially over the entire length of the shaft. The length of the bearing shaft is at least great enough that the center of gravity of the rotor 6 is located between the two ends 8', 8". The shaft 9 is anchored on a first end in a manner fixed against relative rotation in a recess of the bottom 12 by knurling, while its second end is received in the hub 14 of a ribbed star, which is embodied in one piece with the front housing part and of which only one rib 5 is shown in the drawing.

To keep the weight of the rotor 6 low, an annular chamber 16, which is empty except for a few thin-walled ribs 17, is provided between the outer cylinder 7 and the bearing shaft 8. The ribs 17 serve to reinforce the connection between the outer cylinder 7 and the bearing shaft 8.

An encompassing flange 18 is disposed at the transition between the outer cylinder 7 and the flange 13 of the rotor and engages an annular groove 19 of the partition 2, in order to prevent the entry of solid contaminants from the coolant flow into the narrow gap 20 between the outer cylinder and the pipe 11.

A stator 21 of claw pole construction extends around the pipe 11. A supply circuit (not shown) for the stator can for instance be mounted on an annular printed circuit board and slipped onto one shoulder 22 of the pipe 11, where it does not increase the axial structural length of the pump.

Figure 2:
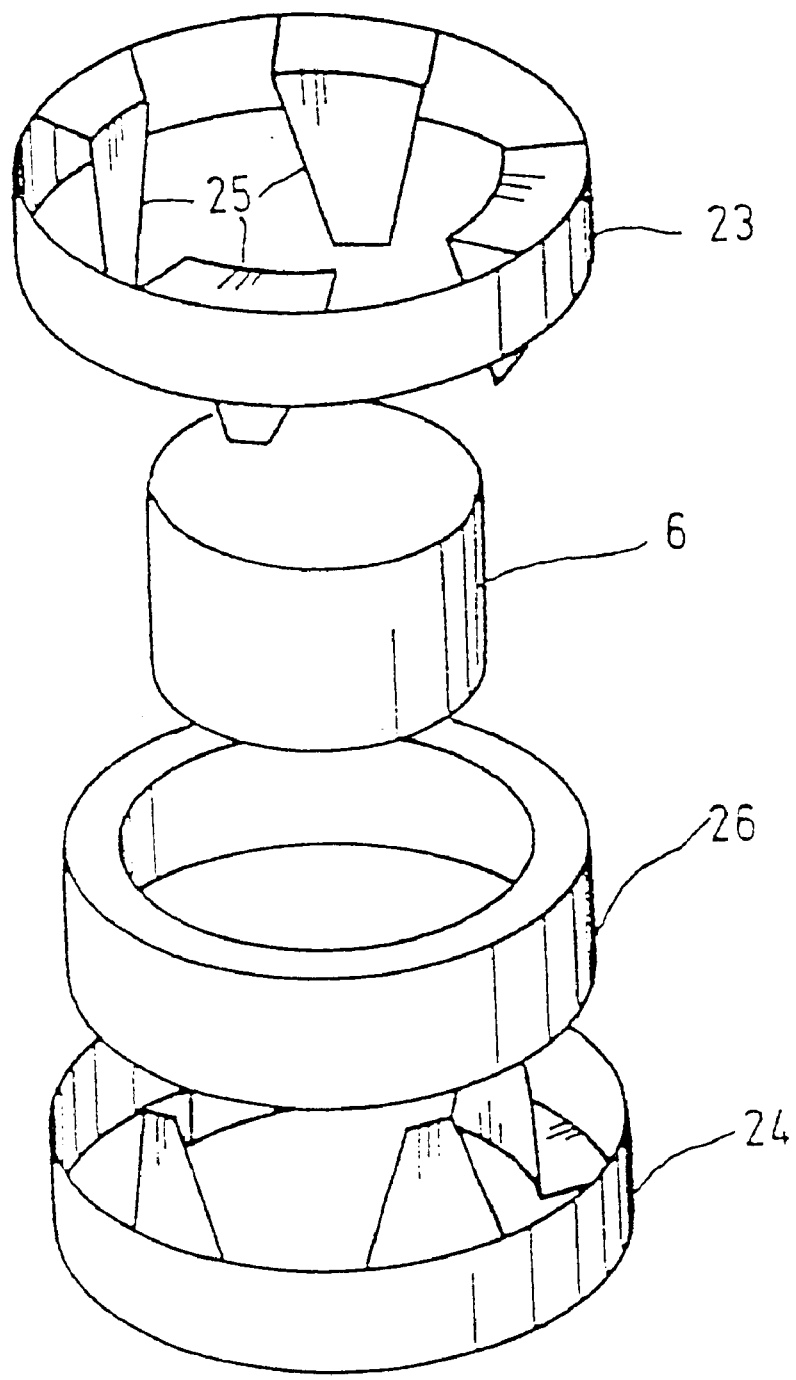
FIG. 2 shows the stator of the pump in an exploded view.

FIG. 2 shows the structure of the stator 21 in an exploded view. It includes two stator plates 23, 24, each of identical design, with an encompassing outer ring and a plurality of claws 25, in this case four of them per plate, which beginning at one edge of the plate 23 and 24 each are curved radially inward and then in the direction of the opposed edge. The claws 25 extend in the axial direction, converging trapezoidally. This improves the efficiency of the motor. The two plates 23, 24 form an annular hollow chamber, whose inner wall in each case is formed by the interengaging claws 25 of the two stator plates, and which receives a winding 26. A magnetic field generated by the winding 26 engages radially inward, with alternating polarity from the claws 25 of the two plates, and thus drives the rotor 6, which is shown in FIG. 2 without its vanes. The winding 26 is designed in double-wound form; that is, it includes two circles that can be acted upon with a current separately and independently from one another. This makes it possible to generate magnetic fields of alternating polarity, by subjecting only one of the circles at a time to current; the direction of current of each circle is always the same and opposite that of the other circle. Such a stator can be operated with simpler power electronics than a single-wound design.

A Hall sensor, not shown, can be provided as a magnetic field sensor, at a site where it is exposed to the variable magnetic field of the rotating rotor 6, in order to monitor the function or the speed of the pump.

This structural form makes it possible, with a single winding in the form of a cylinder coil, to achieve a high number of pole pairs for driving the rotor. This number is defined by the number of claws 25. To increase the drive power of the pump, stators of the type shown in FIG. 2 can also be mounted in a plurality, axially one after the other, on a rotor of suitable length. The claws of the individual stators can be aligned with one another, which keeps the same number of phases of the motor as in the design with a single stator; an increase in the number of phases can also be attained by means of a staggered torsion of the stators relative to one another.

What is claimed is:

1. A fluid pump for a coolant system or heating system of a motor vehicle, comprising a stator (21) and a rotor (6), separated from the stator (21) by a pipe (11), wherein the rotor (6) is immersed in the coolant and forms a vane wheel, wherein the stator (21) is a claw pole stator, wherein an empty annular chamber (16) separates a permanent magnetic outer cylinder (7) from a bearing shaft (8), wherein the bearing shaft (8) surrounds a drive shaft (9), wherein the outer cylinder (7) on one end is closed by a flange (13), wherein the flange carries a plurality of vanes (14).

2. The fluid pump of claim 1, wherein the rotor (6) is disposed axially inside the stator (21).

3. The fluid pump of claim 1, wherein the rotor (6) is connected at at least two axially spaced-apart sites (8', 8"), to said shaft (9), and that the center of gravity of the rotor (6) is located between the two sites.

4. The fluid pump of claim 1, wherein the outer cylinder (7) and the bearing shaft (8) are connected by radial ribs (17).

5. The fluid pump of claim 1, wherein the annular chamber (16) is open on a side remote from the vanes (14) of the door.

6. The fluid pump of claim 1, wherein the rotor is made in one piece of a plastic-bonded magnetic material.

7. The fluid pump of claim 1, wherein a magnetic field sensor is disposed in a magnetic field of the rotor.

8. the fluid pump of claim 1, wherein claws (25) of the claw pole stator are trapezoidal.

9. The fluid pump of claim 1, wherein the stator winding (21) is embodied as a double-wound winding.

* * * * *